United States Patent
Heikkilä et al.

(10) Patent No.: US 7,034,510 B2
(45) Date of Patent: Apr. 25, 2006

(54) METHOD FOR COUPLING INVERTER TO ALTERNATING VOLTAGE

(75) Inventors: Samuli Heikkilä, Helsinki (FI); Mikko Vertanen, Espoo (FI)

(73) Assignee: Abb Oy, Helsinki (FI)

( * ) Notice: Subject to any disclaimer, the term of this patent is extended or adjusted under 35 U.S.C. 154(b) by 0 days.

(21) Appl. No.: 10/476,660

(22) PCT Filed: Jun. 13, 2002

(86) PCT No.: PCT/FI02/00515

§ 371 (c)(1),
(2), (4) Date: Nov. 4, 2003

(87) PCT Pub. No.: WO02/103889

PCT Pub. Date: Dec. 27, 2002

(65) Prior Publication Data

US 2004/0120172 A1    Jun. 24, 2004

(30) Foreign Application Priority Data

Jun. 14, 2001    (FI) .................................. 20011264

(51) Int. Cl.
*G05F 1/00* (2006.01)
*H02M 7/537* (2006.01)
*H02P 27/00* (2006.01)

(52) U.S. Cl. ...................... 323/217; 315/291; 363/131; 318/809

(58) Field of Classification Search ................. 315/246, 315/287, 291; 323/212, 217; 363/39–41, 363/123, 131–132; 318/801, 807, 809, 812; G05F 1/00; H02M 7/537; H02P 27/00
See application file for complete search history.

(56) References Cited

U.S. PATENT DOCUMENTS

| | | | | | |
|---|---|---|---|---|---|
| 4,730,242 | A | * | 3/1988 | Divan | 363/37 |
| 4,864,483 | A | * | 9/1989 | Divan | 363/37 |
| 4,958,269 | A | * | 9/1990 | Gritter | 700/33 |
| 4,968,925 | A | * | 11/1990 | De Doncker | 318/727 |
| 4,998,054 | A | * | 3/1991 | Bose et al. | 318/802 |
| 5,047,914 | A | * | 9/1991 | Dhyanchand et al. | 363/98 |
| 5,334,923 | A | * | 8/1994 | Lorenz et al. | 318/805 |
| 5,450,309 | A | * | 9/1995 | Rohner | 363/71 |
| 5,521,483 | A | | 5/1996 | Pasi et al. | 318/804 |
| 5,801,517 | A | * | 9/1998 | Borle | 323/207 |
| 5,867,004 | A | * | 2/1999 | Drager et al. | 318/701 |
| 6,239,997 | B1 | * | 5/2001 | Deng | 363/95 |
| 6,326,750 | B1 | * | 12/2001 | Marcinkiewicz | 318/432 |
| 6,329,798 | B1 | * | 12/2001 | Huggett et al. | 323/207 |

FOREIGN PATENT DOCUMENTS

| | | |
|---|---|---|
| EP | 0 344 370 | 12/1989 |
| JP | 63035175 | 2/1988 |
| JP | 1157292 | 6/1989 |
| JP | 8331892 | 12/1996 |
| JP | 10042591 | 2/1998 |
| JP | 11155297 | 6/1999 |
| WO | 95/34125 | 12/1995 |

* cited by examiner

*Primary Examiner*—Thuy Vinh Tran
(74) *Attorney, Agent, or Firm*—Dykema Gossett PLLC

(57) ABSTRACT

A method for coupling an inverter to an alternating voltage source, the inverter comprising a current controller, which controls phase currents and implements reference current. The method comprises steps of giving zero current as the reference current for the current controller, determining phase voltages of the inverter, determining frequency of the alternating voltage source from the determined phase voltages, and synchronizing and coupling the inverter to the determined frequency of the alternating voltage source.

4 Claims, 1 Drawing Sheet

METHOD FOR COUPLING INVERTER TO ALTERNATING VOLTAGE

This Application has been filed under 35 U.S.C. 371 based on PCT Application No. PCT/FI02/00515, filed Jun. 13, 2002, which has priority based on Finland Patent Application No. 20011264, filed Jun. 14, 2001.

BACKGROUND OF THE INVENTION

The invention relates to a method for coupling an inverter to an alternating voltage, the inverter comprising a current controller, which controls phase currents and implements reference current.

When an inverter is being used, it is often necessary to couple it to an alternating voltage source. This occurs for example during a speed start of a permanent-magnet machine, a speed start of an asynchronous machine when a rotor thereof has a residual flux, or during synchronization of a network inverter into an electric network. A speed start refers to a situation where an electric machine rotating in an uncontrolled manner is to be controlled by an inverter. In all of the aforementioned situations, the speed start or synchronization can be based on rotation of voltage or flux, and on observation of this rotation, since for example a rotating magnetized rotor is known to produce alternating voltage in a winding of a stator surrounding the rotor.

In a known method for coupling an inverter to an alternating voltage source, the output voltage is set to zero, or a zero phasor is formed for a predetermined period of time, and behaviour of the current is observed. This type of methods are disclosed in EP 0,653,116 B1 for a short-circuit machine, WO 9,534,125 for a network inverter, and EP 0,994,561 A2 for a synchronous permanent-magnet motor. All the publications disclose a method where zero phasors of the inverter generate two or more current impulses, or short circuits, which are used to determine flux direction, frequency of rotation, and amplitude, if required. These methods provide rapid operation if the voltage is high enough.

A problem with the prior art methods is that synchronization calculations are based on individual and momentary current measurements, which give too much significance to interference. This unavoidably results in inaccuracy that is more emphasized at low current values, i.e. at low voltages of the voltage source. Furthermore, as the frequency decreases, frequency determination becomes more accurate and also requires a longer time interval between the short circuits.

The prior art methods are based on observation of current behaviour. In case of an asynchronous machine, this requires data on short circuit inductance, which is an inaccurate parameter and produces more errors in the operation of the method. In connection with an asynchronous machine, the method does not operate quite reliably, wherefore it can only be used in certain applications. Use of the prior art methods further requires special modulation logic in a modulator of the inverter for implementing required zero vectors that enable synchronization.

BRIEF DESCRIPTION OF THE INVENTION

An objective of the invention is to provide a method with none of the aforementioned drawbacks, enabling an inverter to be coupled to an alternating voltage source more reliably than previously and with similar measurements of electrical quantities as the prior art methods. This objective is achieved by a method according to the invention that is characterized in that the method comprises steps of giving zero current as the reference current for the current controller, determining phase voltages of the inverter, determining frequency of the alternating voltage source from the determined phase voltages, and synchronizing and coupling the inverter to the determined frequency of the alternating voltage source.

According to a basic idea of the method of the invention, during synchronization the reference current of the inverter is zero. The inverter implements reference current obtained from a current controller. The zero current control thus automatically results in inverter output voltage that is equal to the voltage of the voltage source in amplitude and in phase angle within the limits of the performance of the current control, and a change in the phase angle can be used further to calculate the frequency of the voltage source. In the simplest manner, the inverter output voltage is determined based on an intermediate circuit voltage and information on switch position. Further integration of the output voltage provides amplitude and phase angle of the stator flux. This information can be used to initialize and synchronize normal control, such as vector control.

In prior art methods, the voltage is set to zero and the current is monitored. In the method according to the invention, the aim is to control the current to zero and to monitor the output voltage of the inverter or the integral of the voltage, i.e. the stator flux, according to an embodiment of the invention.

The method according to the invention provides considerable advantages over the prior methods. According to a preferred embodiment of the invention, the voltage is integrated during synchronization to reduce the effect of noise and other interference and to obtain a reliable estimate of the stator flux, which can be used further to activate normal control. The method according to the invention is independent of any motor/network model parameters, such as inductances or resistances. Therefore the method is in no way disturbed e.g. by output filters possibly provided between the inverter and the alternating voltage.

A problem with a general voltage model regarding an electric machine or the like is the drift resulting from an error in resistance. In the method according to the invention, the current is adjusted to zero as accurately as possible, so that any resistance error in the model does not affect the flux accuracy. Furthermore, the method does not require additional excitation signals and it can be implemented by a conventional modulator and current control.

BRIEF DESCRIPTION OF THE FIGURES

The invention will be described below in more detail in connection with preferred embodiments and with reference to the accompanying drawings, in which.

DETAILED DESCRIPTION OF THE INVENTION

Figure 1:
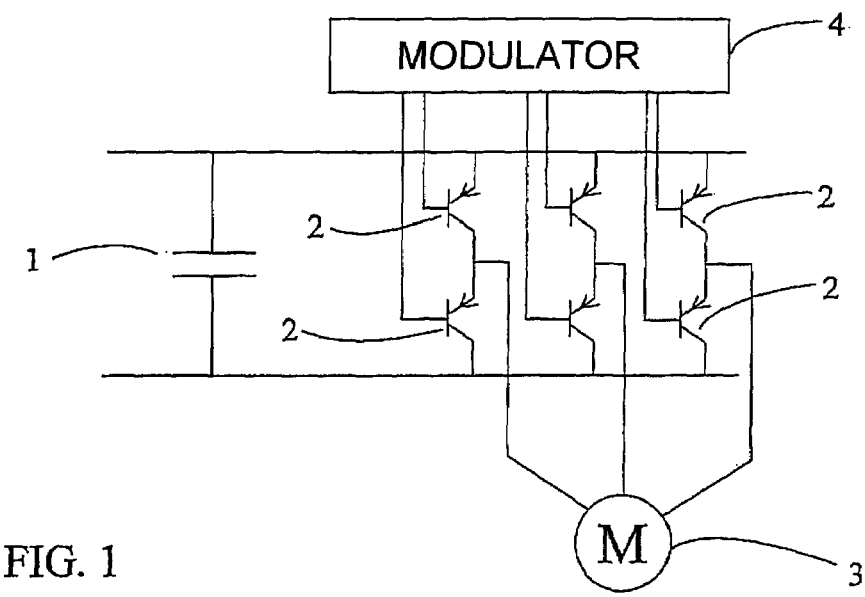
FIG. 1 shows generally an inverter.

FIG. 1 shows generally an inverter, or a frequency converter. The output of the inverter shown in the figure is coupled to drive a motor 3. In a simplified form, the inverter consists of power semiconductor components 2, a capacitor 1 constituting a direct-voltage intermediate circuit, and a modulator 4 controlling switch components. The modulator forms a switch combination on the basis of certain modulation logic and voltage reference, current reference or some other reference input into the modulator.

As the method according to the invention is applied, modulation, or control, is allowed at first in the inverter. If a load, such as the motor in FIG. 1, has generated alternating voltage in the inverter output, i.e. if the load exhibits a rotating flux, the inverter output voltage starts increasing, provided that the same switch position, such as a zero phasor, is on for a sufficiently long period. A zero phasor usually refers to a voltage phasor formed during short circuiting of the load.

According to the invention, the current controller obtains zero current as the reference current. To enable operation of the current controller, inverter output currents are determined. This takes place in a three-phase system for example by measuring currents of two phases, and then calculating the current in the third phase from the two determined currents, provided that the system comprises no zero conductor. The current controller tries to keep the current at zero, and the modulator thus obtains reference voltage $$u_{ref} = -k_c i_s,$$

wherein $$u_{ref} = u_{ref,x} + j u_{ref,y}$$

is a reference voltage vector used to further calculate phase-specific reference voltages, $$i_s = i_{sx} + j i_{sy}$$

is a stator current vector determined on the basis of two or three measured phase currents, and $k_c$ is suitable controller gain, the value of which is obtained through experiments or according to a rule. For example, it is possible to select $k_c = L \Delta t$, wherein L is the inductance seen in the inverter output, and $\Delta t$ is length of a control period, the controller thus aiming to implement the reference current (=0) during one control period. As is well known, a three-phase system can be described by means of one complex vector referred to as a space vector or a phasor. The above equations are specifically set forth in the form of space vectors.

The invention comprises determining inverter phase voltages, preferably calculated from the intermediate circuit voltage and the information on switch positions. The accuracy of voltage calculation can be increased further by taking into account threshold voltages and switching delays of switch components. Since the current is controlled to zero, the resistances have a minimal effect on the magnitude of the output voltage. In the invention, the rate of change of the voltage vector in the inverter output is used to determine the frequency of the alternating voltage to which the inverter is coupled, since the alternating voltage and the inverter voltage are exactly the same when the current control controls the output current to zero. The current controller prevents flow of current, and this is only possible when the aforementioned voltages are equal.

While the zero current controller is active, a preferred embodiment of the invention comprises calculating a stator flux vector $$\Psi_{s,1} = \int_T (u_s - R_s i_s) dt, \qquad (1)$$

wherein $u_s$ is the actual stator voltage, and $R_s$ is the resistance seen at the inverter output, i.e. in connection with a motor the resistance is the stator resistance.

Figure 2:
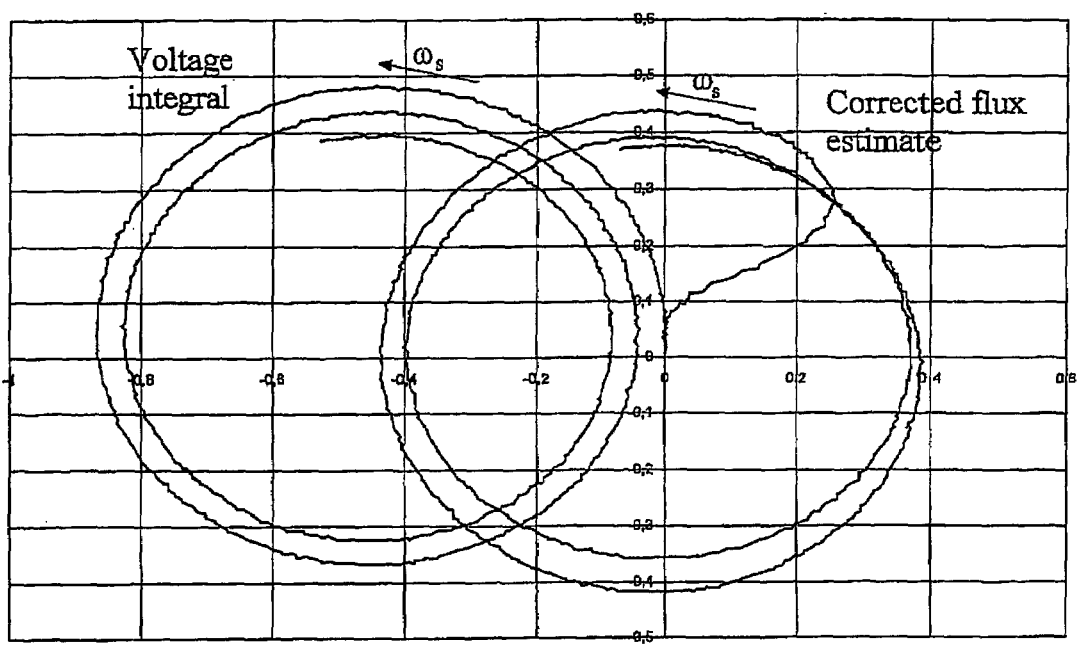
FIG. 2 shows graphs of stator flux during activation of the method.

Equation (1) starts from an initial flux value of zero, whereas in reality the flux can have an initial value other than zero according to equation $$\Psi_{s,2} = \int_T (u_s - R_s i_s) dt + \Psi_0 \qquad (2)$$

wherein $\Psi_0$ is the initial flux value. As regards calculation, the initial flux value is important since in pure integration without any feedback, the initial value will never disappear. The flux circle shown on the left in FIG. 2 is a result of integration according to Equation (1) where the initial value of the flux estimate is zero, even though the actual initial flux value is some other value. The midpoint of the circle has a reversed phase, i.e. it is in a 180° phase shift with respect to the actual initial flux value. When Equation (1) has been integrated for a sufficiently long period of time, for example for one or more full cycles, the midpoint of the circle can be determined in a simple manner.

In practice however, the midpoint, or the initial flux value, must be obtained as quickly as possible, and the flux estimate must be placed on an origin-centred orbit with the actual flux magnitude. Three alternative preferred embodiments are set forth below for detecting the initial flux value and for placing the flux estimate in an origin-centred orbit similar to the flux circle shown on the right in FIG. 2.

(A) Applying the Least Squares Method

Assume that the actual flux travels on an origin-centred orbit with a constant or slowly changing radius. Such a situation occurs e.g. in an asynchronous machine, a permanent-magnet machine or in an electric network. The actual flux amplitude and phase angle are not known when determination of the flux centre is started. A flux estimate is calculated from Equation (1), i.e. from the initial value of zero. The flux estimate fulfils the circle equation $$(\Psi_{sx,1} - r_x)^2 + (\Psi_{sy,1} - r_y)^2 = r_x^2 + r_y^2, \qquad (3)$$

wherein $\Psi_{sx,1}$, $\Psi_{sy,1}$ are x- and y-components of the flux, and $r = r_x + j r_y$ are co-ordinates of the circle midpoint. The circle midpoint $r_x$, $r_y$ is in a 180° phase shift with the actual initial flux value, i.e.

$$r = -\Psi_0. \qquad (4)$$

Equation (3) is thus reduced to the form $$\Psi_{sx,1}^2 + \Psi_{sy,1}^2 = 2\Psi_{sx,1} r_x + 2\Psi_{sy,1} r_y. \qquad (5)$$

Solving two unknowns requires at least two equations, i.e. two values other than zero for flux estimates $\Psi_{sx,1}, \Psi_{sy,1}$. However, a more accurate and useful arrangement is to utilize more than two points, e.g. 10 to 100 points, at a length of an arc of about 20° to 45°. It is thus possible to perform fitting by applying linear regression., or the least squares method. In practice, it can be difficult to process a large amount of data in a real-time system, wherefore an off-line algorithm should preferably be replaced with the recursive least square (RLS) method. Equation (5) is already in a form to which the RLS algorithm can be applied, as will be illustrated more clearly by the notations below $$y = x^T r = [2\Psi_{sx,1} \ 2\Psi_{sy,1}][r_x \ r_y]^T, \qquad (6)$$

wherein $$y = \Psi_{sx,1}^2 + \Psi_{sy,1}^2, \ x^T = [2\Psi_{sx,1} \ 2\Psi_{sy,1}].$$

Least square equations for the midpoint iterative solution are as follows [Åström, Wittenmark: Adaptive control, 1989]

$$K(t) = P(t-1)x(t)(I + x^T(t)P(t-1)x(t))^{-1} \quad (7)$$
$$P(t) = (I - K(t)x^T(t))P(t-1)$$
$$r(t) = r(t-1) + K(t)(y(t) - x^T(t)r(t-1)),$$

wherein t denotes the present calculation period, i.e. the present discrete time point, and t−1 refers to the previous calculation period.

The RLS method calculates a new and more accurate estimate for the circle midpoint and for an opposite number of the initial flux value during each round of calculation. The origin-centred flux of Equation (2) thus obtains an estimate $$\Psi_{s,2} = \Psi_{s,1} - r. \quad (8)$$

The operation of the algorithm as described above in case of an actual inverter and a 15 kW motor is shown on the right flux circle in FIG. 2, where the corrected flux estimate converges to an origin-centred form in less than 10 ms. The figure only shows the operation of zero current control and none of the steps related to a normal start.

(B) Flux Calculation with Low-pass Filtration

Assume that the actual flux travels on an origin-centred circular orbit with a constant or slowly changing radius, as for example in connection with an asynchronous machine, a permanent-magnet machine or an electric network. The actual flux amplitude and phase angle are not known when the flux calculation is started. Instead of the pure integration according to Equation (1), the flux is calculated by filtering the voltage with a low-pass filter of the first order, so that the initial value is no longer significant and the flux estimate converges onto an origin-centred circular orbit. Instead of Equation (1), the following equation is thus obtained for the flux estimate $$\Psi_{s,3} = \int_T [u_s - R_s i_s - (1/\tau_f)\Psi_{s,3}]dt, \quad (9)$$

wherein $\tau_f$ is a time constant of low-pass filtration. With a small time constant, the initial value is fast forgotten and the flux estimate rapidly converges to an origin-centred form. A disadvantage is that the low-pass filtration is known to subject the signal to amplitude and angle errors that are dependent on the filtration time constant and on the signal frequency according to equations $$|G| = 1/\sqrt{1 + (\tau_f \omega)^2} \quad (10)$$

$$\arg(G) = \arctan(\tau_f \omega)$$

wherein G is a transfer function for low-pass filtration, and $\tau_f$, $\omega$ refer to filter time constant and signal frequency. When the flux estimate has converged, the amplitude and angle errors resulting from the filtration can be corrected by means of Equations (10) to obtain the following estimate for the actual flux $$\Psi_{s,2} = \frac{1}{|G|}\Psi_{s,3} e^{-\arg(G)}. \quad (11)$$

(C) Method of a Dot Product of Flux and Voltage When the Flux Amplitude is Known Assume that the actual flux travels along an origin-centred circular orbit with a constant radius. The actual flux amplitude is known, but the phase angle is not known. Such a situation occurs e.g. in connection with a permanent-magnet machine and an electric network. It is further possible to apply the method of item A, if one of the coordinates for the centre of the flux circle is known. However, the equations would thus be rather complicated and they would require calculation of the square root, for instance. Therefore, a simpler method is more useful.

The flux amplitude is known, such as a permanent magnet flux or the network voltage, which is measured via the intermediate circuit of the inverter according to the invention. The flux estimate is further calculated from an initial value of zero by means of Equation (1). The flux estimate amplitude can be controlled to the actual flux amplitude to provide a correction to be made in the direction of the flux $$\Delta\Psi_d = k_a(\Psi_m^2 - |\Psi_s|^2), \quad (12)$$

wherein $\Psi_m$ is the actual flux amplitude that is known and $k_a$ is a suitable correction coefficient. Another correction term for the angle of the flux estimate is obtained from the required perpendicular alignment of the flux estimate and the derivative thereof, i.e. the dot product thereof is zero. The flux derivative can be replaced with the mere voltage, since the current is zero. A correction to be made in the direction of the flux tangent is $$\Delta\Psi_q = k_p \Psi_s \cdot u_s, \quad (13)$$

wherein $k_p$ is a suitable correction coefficient, which also takes into account the sign of the frequency. The correction is thus calculated based on the dot product of the flux and voltage vectors. Combining (1), (12) and (13) provides the following equation for the flux estimation $$\Psi_{s,2} = \int_T [u_s - R_s i_s + \Psi_{s,2}(\Delta\Psi_d - j\Delta\Psi_q)]dt. \quad (14)$$

This method of item C assumes that the flux amplitude is constant and known, which is not usually the case with asynchronous machines. However, also in an asynchronous machine the flux amplitude can be estimated during zero current control, if the rotor time constant of the machine is known. In such a case, the stator and rotor fluxes of the asynchronous machine overlap, and the following equation applies for the amplitudes thereof $$\dot\Psi_s = \dot\Psi_r = -(1/\tau_r)\Psi_s = -(1/\tau_r)\Psi_r, \quad (15)$$

wherein $\tau_r$ is the rotor time constant. The flux amplitude can be calculated from this equation rather accurately if the flux value is known at the end of the running mode.

When the aforementioned zero current control and flux calculation are activated, a frequency estimate is simultaneously calculated from a change in the flux angle. The frequency estimate becomes more accurate with the transformation of the flux estimate to be origin-centred.

The zero current control can be stopped when the flux estimate is known to have converged with the actual flux. The convergence is declared complete when the flux estimate exceeds zero or some other low threshold value, but the amplitude no longer changes, or the rate of change of the amplitude is below a predetermined threshold value. On the other hand, if the flux estimate constantly remains at zero, it can be said that the load exhibits no rotating flux and the inverter output thus comprises no alternating voltage, whereupon the zero current control can be terminated.

When the zero current control is terminated, normal control is initialized with the present flux and frequency estimate values. In the control of a permanent-magnet machine and a network inverter, speed or frequency control can be immediately activated, if desired, and maximum torque is in use. In an asynchronous machine, the stator and rotor flux are increased to nominal values or values corresponding to the operating point, whereafter the maximum torque is in use. Before this, the maximum torque is either restricted to zero, in which case the entire current can be used to increase the flux, or the torque is restricted to a value that is proportional to the square of the flux.

It is evident to a person skilled in the art that as the technology develops, the basic idea of the invention can be applied in various ways. Thus, the invention and the embodiments thereof are not restricted to the examples described above, but they may vary within the scope of the claims.

The invention claimed is:

1. A method for coupling an inverter to an alternating voltage source, the inverter comprising a current controller, which controls phase currents and implements reference current, comprising the steps:

giving zero current as the reference current for the current controller, controlling the phase currents of the inverter output to zero;

determining-phase voltages of the inverter while the current is controlled to zero, determining frequency of the alternating voltage source from the determined phase voltages, synchronizing and coupling the inverter to the determined frequency of the alternating voltage source, calculating, based on the determined phase voltages, a flux estimate, correcting the calculated flux estimate to be origin centered to provide a flux, determining phase angle and amplitude of the flux, determining rate of change of the flux phase angle, including the flux frequency, and synchronizing and coupling the inverter to the alternating voltage source in accordance with properties of the flux.

2. A method according to claim 1, wherein the correction of the flux estimate comprises the steps of:

adapting the flux estimate to a circle equation, and solving an initial flux value from the circle equation after the adaptation.

3. A method according to claim 1, wherein the correction of the flux estimate comprises the step of:

low-pass filtering the phase voltages during calculation of the flux estimate, the estimate then converging onto the origin centered flux.

4. A method according to claim 1, wherein the flux amplitude is known, and the correction of the flux estimate comprises the steps of:

correcting the flux estimate according to known flux amplitude in a direction of the flux, and correcting the flux estimate according to a dot product of the flux and stator voltage in the direction of the flux tangent.

* * * * *